United States Patent [19]

Derezinski et al.

[11] Patent Number: 5,320,679
[45] Date of Patent: Jun. 14, 1994

[54] COATING HOPPER WITH CRISS-CROSS FLOW CIRCUIT

[75] Inventors: Stephen J. Derezinski, Penfield; Don T. Ras, Webster; Brian M. Fauci, Holley, all of N.Y.

[73] Assignee: Eastman Kodak Company, Rochester, N.Y.

[21] Appl. No.: 98,179

[22] Filed: Jul. 28, 1993

[51] Int. Cl.⁵ .............................................. B05C 3/02
[52] U.S. Cl. ....................................... 118/412; 425/461; 118/DIG. 2; 118/DIG. 4; 118/410; 118/411
[58] Field of Search ............... 425/461, 467, 382.4; 118/412, 411, 410, DIG. 2, DIG. 4

[56] References Cited

U.S. PATENT DOCUMENTS

| | | | |
|---|---|---|---|
| 4,017,240 | 4/1977 | Nelson | 425/192 R |
| 4,124,346 | 11/1978 | Greenwood et al. | 425/188 |
| 4,137,027 | 1/1979 | Ruger | 425/133.5 |
| 4,293,517 | 10/1981 | Knox | 264/176 R |
| 4,344,907 | 8/1982 | Herrington | 264/173 |
| 4,411,614 | 10/1983 | Feather | 425/466 |
| 4,435,141 | 3/1984 | Weisner et al. | 425/131.1 |
| 4,544,341 | 10/1985 | Gnadig et al. | 425/192 R |
| 4,552,521 | 11/1985 | Linnstaedter | 425/131.1 |
| 4,619,802 | 10/1986 | Cloeren | 264/171 |
| 4,789,513 | 12/1988 | Cloeren | 264/171 |
| 4,826,422 | 5/1989 | Hunter | 425/461 |
| 5,045,264 | 9/1991 | Kirksey | 264/171 |
| 5,061,166 | 10/1991 | Gohlisch et al. | 425/133.5 |
| 5,067,432 | 11/1991 | Lippert | 118/413 |
| 5,073,102 | 12/1991 | Guggiari | 425/461 |

Primary Examiner—W. Gary Jones
Assistant Examiner—Brenda Lamb
Attorney, Agent, or Firm—Clyde E. Bailey

[57] ABSTRACT

A criss cross coating hopper 10 is provided which is capable of producing uniform flow distribution patterns. The hopper 10 is comprised of a first and second hopper halves 12,14. First and second hopper halves 12,14 each have a first and second planar surface 20,40, respectively, adjoining a first and second cavity 22,42, respectively, each cavity 22,42 having a land surface 28,50 near the entrance end 26,48 and exit end 24,46. Inserts 62,64 are positioned against the land surface 60 of the first hopper half 12 and the land surface 50 of the second hopper half 14, respectively. The first and second hopper halves 12,14 and the inserts 62,64 cooperate to form an exit slot 69 recessed into first and second planar surfaces 20,40.

11 Claims, 13 Drawing Sheets

COATING HOPPER WITH CRISS-CROSS FLOW CIRCUIT

FIELD OF THE INVENTION

The invention relates to coating hoppers, and more particularly, to a hopper which achieves uniform flow distribution for emulsions and polymeric materials using criss-cross flow circuits.

BACKGROUND OF THE INVENTION

In conventional coating hoppers for coating a fluid onto the surface of a web, such as hoppers for photographic emulsions and polymeric materials, fluid is delivered into the hopper through a center inlet passage or an end inlet passage. In either case, the inlet passage is in fluid communication with an extrusion slot portion of the hopper via an interior flow distribution manifold or channel formed in at least one of the die portions comprising the hopper. In both cases, achieving relatively uniform widthwise flow distribution at the extrusion slot is a problem. One way known to accomplish more uniform widthwise flow distribution is to contour specially the interior flow distribution manifold and lips of the extrusion slot. Contouring of the manifold is needed to offset the pressure loss which must occur between the inlet passage and the far end of the manifold. Properly done, this conventional practice is adequate for a specific set of fluids and flow conditions. However, a shortcoming of this practice is manifest when there is a change in fluid flow. Typically, a change in fluid flow alters the pressure relationship in the manifold to create unacceptable flow distribution, resulting in excessive fluid accumulation or flooding in the far end of the manifold.

Rather than contouring the manifold, a different flow path or flow circuit has been shown to evenly distribute the pressure of the fluid flow in the hopper. One such flow circuit is the criss-cross circuit in which fluid enters the inlet channel and crosses as it enters the inlet channel. However, the added complexity of the passages needed in the hopper device does require some special method of hopper construction while maintaining the mechanical stability of the extrusion slot.

The use of some sort of insert device to achieve flow uniformity of a single stream has been attempted in the prior art. U.S. Pat. No. 4,017,240 to Nelson teaches sheet extrusion of elastomeric material wherein an extruded strand is passed through a die having a symmetrical runner system which divides and subdivides the strand into multiple strands equal in length and cross section. The strands are then gradually transformed into laterally adjoining flattened triangular portions in which substantially the same cross-sectional area is maintained as the cross-sectional shape changes. The shaped strands then pass out of the manifold in a continuous lateral exit. This device, therefore, has the shortcoming of branching the material flow through an array of channels which all empty into a final damping cavity.

U.S. Pat. No. 4,411,614 to Feathers teaches a removable contoured insert for an extrusion die dedicated to a particular coating fluid. The insert comprises a plurality of feed passages adapted to communicate with the distribution channel and with the inlet passage of the die. Fluid passing through the plurality of feed passages, similar to Nelson '240, then empties into a final damping cavity.

Accordingly, there persists a need for an apparatus for achieving uniform flow distribution in a coating hopper for emulsions and polymeric materials that obviates the shortcomings of the prior art.

SUMMARY OF THE INVENTION

It is, therefore, the object of the invention to overcome the shortcomings of the prior art. Accordingly, in one aspect of the invention, a crisscross flow hopper comprises a first hopper half having a first planar surface, the planar surface adjoining a first elongated cavity having an exit and an entrance end, the first cavity having a land surface near the entrance end and a first widthwise flow distribution channel adjacent the land surface. A second hopper half having a second planar surface, the planar surface adjoining a second elongated cavity having an exit end and an entrance end, the second cavity having a land surface near the entrance end and a second widthwise flow distribution channel. An insert positioned at least against the land surface of the first hopper half or the land surface of the second hopper half wherein said first and second hopper halves and said insert cooperate to form an exit slot recessed into the first and second planar surfaces; a damping chamber adjacent the exit slot and in fluid communication therewith at the exit end of the first and second cavities, the damping chamber in fluid communication with the first distribution channel at a first side of the hopper, the damping chamber in fluid communication with the second distribution channel at a second side of the hopper; an entrance chamber at the entrance end of the first and second cavities, the entrance chamber in fluid communication with the first distribution channel at the second side of the hopper the entrance chamber in fluid communication with the second distribution channel at the first side of the hopper.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE INVENTION

Figure 1:
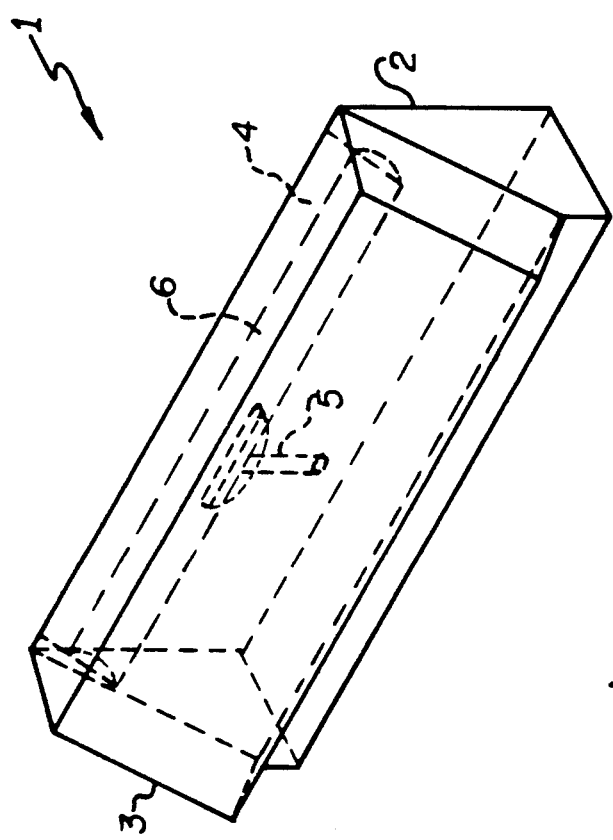
FIG. 1 is a perspective view of a typical prior art coating hopper.
Figure 2:
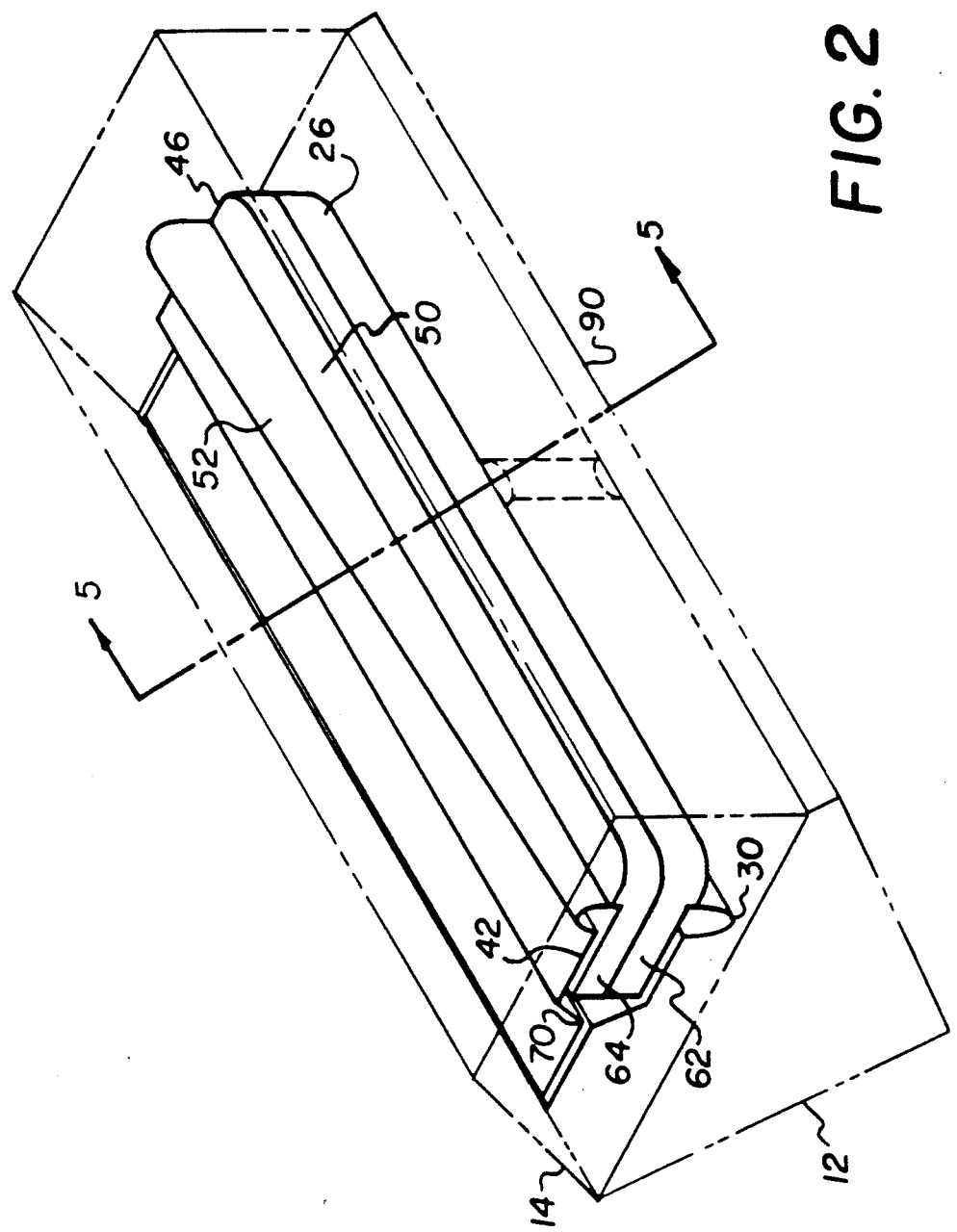
FIG. 2 is a perspective view, partially in phantom, of the coating hopper of the invention.

Turning now to the drawings, and more particularly to FIG. 1, there is shown prior art hopper 1 for extruding fluids. Typically, conventional hopper 1 comprises two die portions 2,3 structurally connected to form an elongated extrusion slot 4 therebetween through which the coating fluid is extruded onto the surface of a web. A centered inlet channel 5 formed in at least one of the die portions 2,3 extends into a distribution channel 6 which extends transversely across hopper 1 and communicates with extrusion slot 4. The transverse channel 6 by virtue of flow in the transverse direction has, by necessity, a pressure decrease in the transverse direction which produces nonuniform pressure along channel 6 at the entrance to slot 4. Nonuniform pressure in channel 6, thereby, produces nonuniform flow through slot 4. Prior art teaches that this nonuniformity can be minimized by increasing the volume of channel 6, shaping channel 6, and/or specially contouring the cross-section of slot 4. However, none of the methods are adequate for completely eliminating the pressure nonuniformity inherent to the transverse flow in cavity 6.

Figure 3:
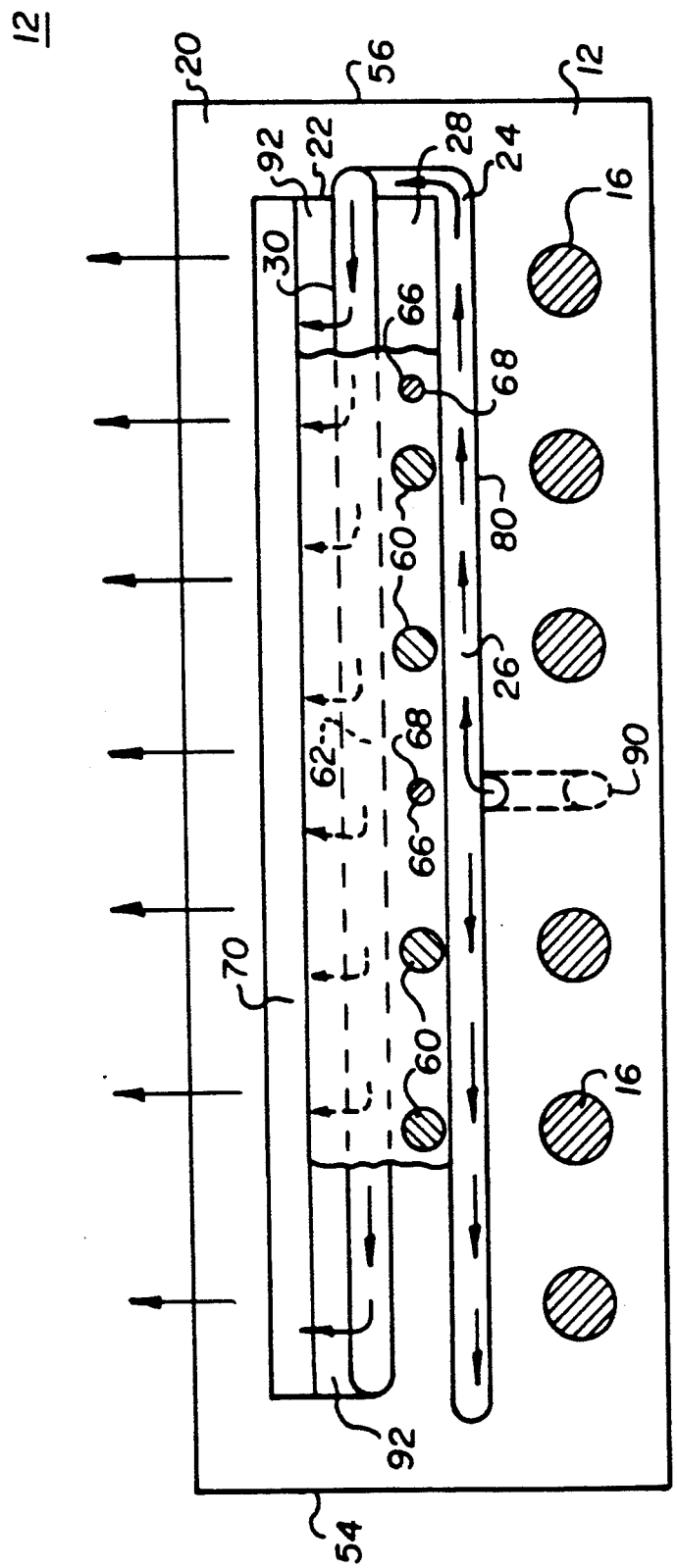
FIG. 3 is the first hopper half, opened along line 3—3 of FIG. 5 to expose the first cavity having a first insert therein.
Figure 4:
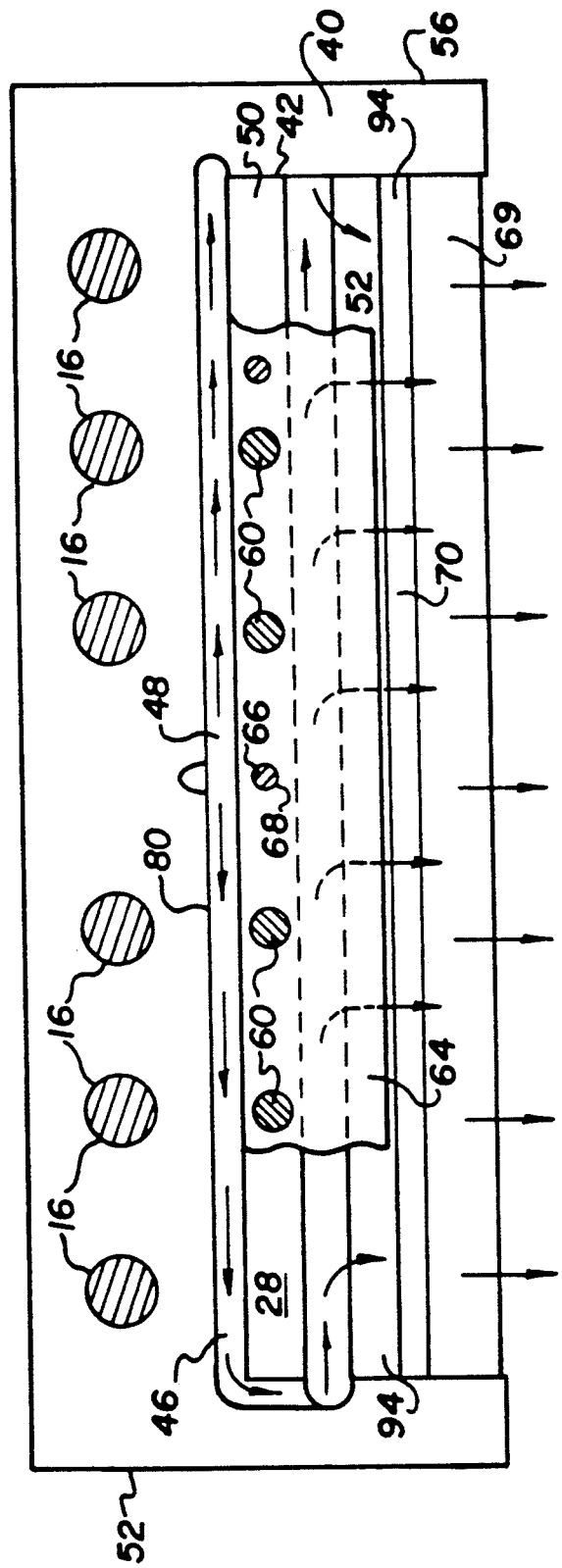
FIG. 4 is the second hopper half, opened along line 4—4 of FIG. 5 to expose the second cavity having a second insert therein.
Figure 5:
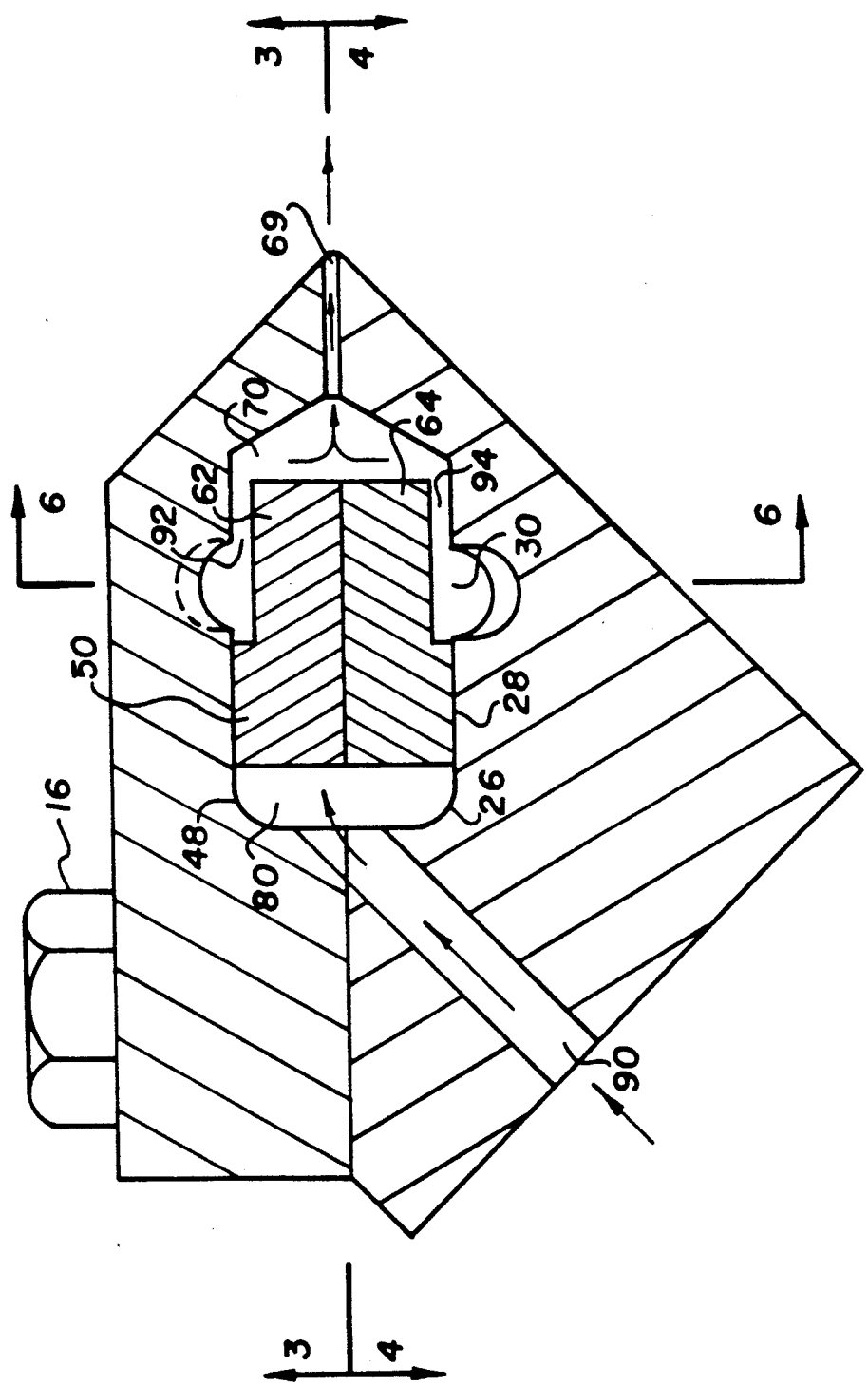
FIG. 5 is a section view of FIG. 2 taken along the 5—5 line.

Turning now to FIGS. 2-5, and to the preferred embodiment of the invention, criss-cross hopper 10 comprises first and second hopper halves or die portions 12,14 preferably joined by bolts 16 (FIGS. 3 to 5). First and second hopper halves 12,14 may be made of stainless steel but, any chemically inert material can be used. FIG. 3 shows first hopper half 12 comprising first planar surface 20 adjoining a first cavity 22. First cavity 22 has a fluid entrance end 24, a transverse fluid passage 26 and a land surface 28 between entrance passage 26 and a first widthwise distribution channel 30 (the arrows indicate fluid flow direction). Similarly, FIG. 4 shows second hopper half 14 comprising a second planar surface 40 adjoining a second cavity 42. Similarly, second cavity 42 comprises a fluid entrance end 46 and a transverse fluid entrance passage 48. A land surface 50 is positioned between entrance passage 48 and a second widthwise flow distribution channel 52.

Figure 6:
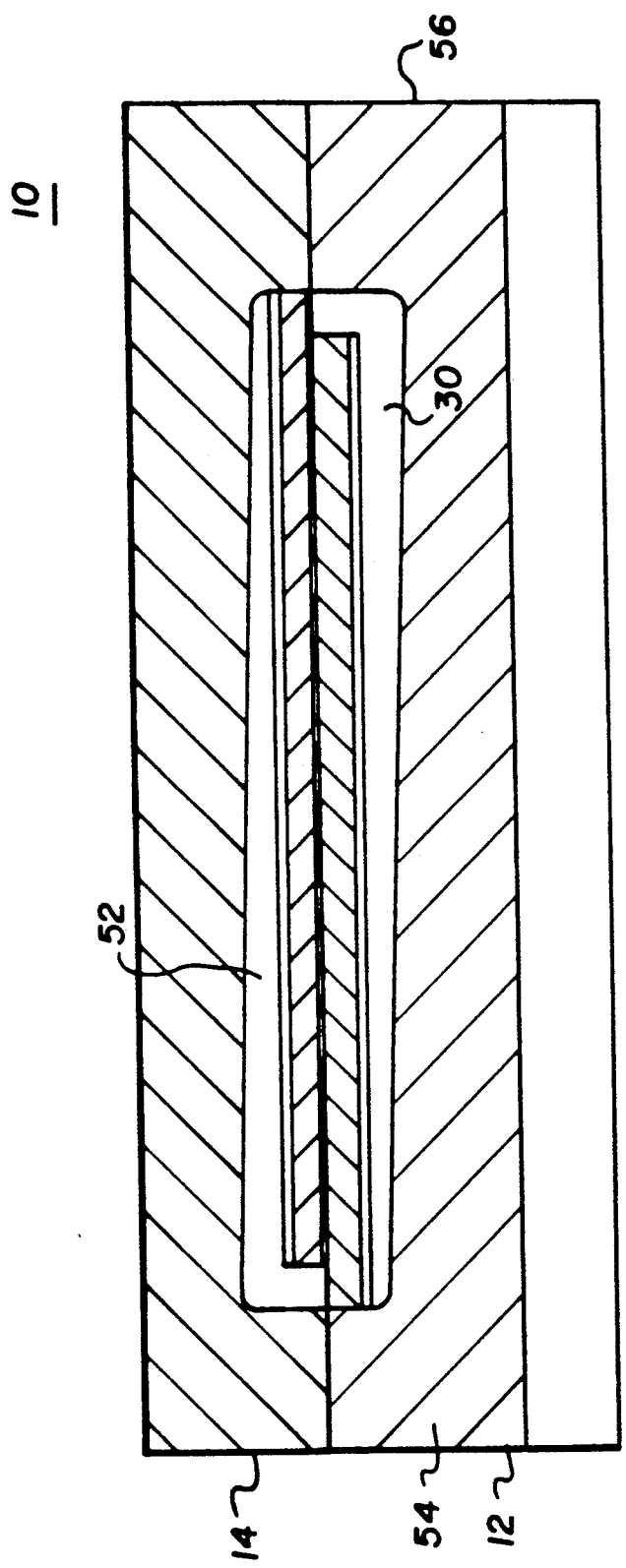
FIG. 6 is a section view of FIG. 5 taken along the 6—6 line.

FIG. 6 shows first and second distribution channels 30,52 each being tapered from opposite sides 54,56 of the hopper 10. Tapering produces a nearly constant pressure gradient in the distribution channels 30,52 in opposing flow directions. Skilled artisans will appreciate that the distributions channels 30,52 could have other shapes, although taper is preferred, and still achieve the objectives of the present invention.

Figure 7:
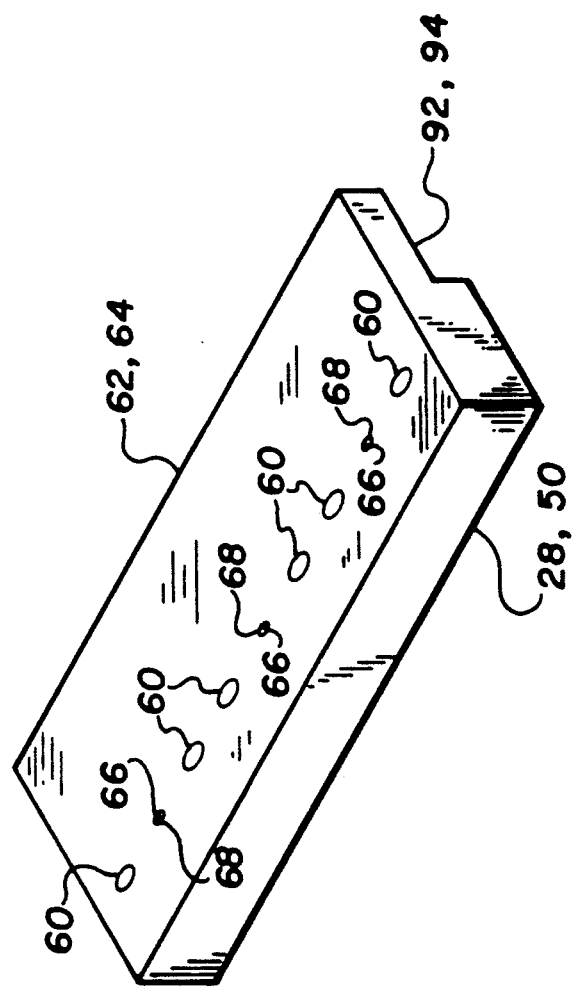
FIG. 7 is a perspective view of the insert of the invention.

In FIGS. 3, 4 and 7, elongated inserts 62,64 in the preferred embodiment, are positioned against land surface 28 of first hopper half 12 and 64 against land surface 50 of second hopper half 14, respectively. Skilled artisans will appreciate that one insert 62 or 64 may be used within the definition of the invention. In this embodiment, insert 62 or 64 would positioned against abutting land surfaces 28 and 50. Further, location pins 66, matched with apertures 68 in the inserts 62,64, are used to properly position inserts 62,64 against land surfaces 28,50. Bolts 60 are preferably used to secure inserts 62,64 to hopper halves 12,14, respectively, although other fastening means may be used. Thus, first and second hopper halves 12,14 cooperate to form an exit slot 69 bounded by first and second planar surfaces 20,40, as shown more clearly in FIG. 2. Inserts 62,64 are preferably made from titanium, i.e., the same material from which the hopper 10 is preferably constructed, although those skilled in the art will appreciate that other materials may be used such as, stainless steel and thermoplastic materials, such as rubber. According to FIG. 7, insert 62 or 64 (both being identical) has a land surface 28 or 50 and a stepped plane 63 to form a half-flow slot 92 or 94. As indicated previously, inserts 62 and 64 are attached together with bolts 60 and positioned with pins 66 in apertures 68.

Turning again to FIGS. 3 and 4, a damping chamber 70 is formed between inserts 62,64 and exit slot 69. Chamber 70 is in fluid communication with fluid entrance ends 24,46 of the first and second entrance passages 22,42, via distribution channels 30,52. Damping chamber 70 is therefore in fluid communication both with the first distribution channel 30 at a first side 54 of hopper 10, as shown in FIG. 3, and with second distribution channel 52 at a second side 56 of hopper 10, as shown in FIG. 4.

Referring again to FIGS. 3, 4, and 5, an inlet chamber 80 is defined by inserts 62,64 and entrance passages 26,48. Chamber 80 is in fluid communication with both the first distribution channel 30 at the second side 56 of hopper 10 and with the second distribution channel 52 at the first side 54 of the hopper 10.

In operation, fluid is supplied to the chamber 80 (FIGS. 3-5) of the hopper 10 by any means within the definition of the invention. A passageway 0 positioned centrally in the first hopper half 12 is preferred. Fluid entering the chamber 80 is split into equal, oppositely flowing portions as it flows toward the first and second distribution channels 30,52. The inserts 62,64 divert flow to each end 24,46 of the hopper 10. The two flows then cross the width of the hopper 10 in tapered channels 30,52 (FIG. 6), as described above, in opposite directions then rejoin in the damping chamber 70 through half flow slots 92,94.

A more complete understanding of the present invention and its unobvious features and advantages can be obtained by referring to the following illustrative examples of the practice of the invention, which examples are not intended, however, to be unduly limitative of the invention.

EXAMPLE 1

Coating uniformity studies were conducted with a conventional hopper and the novel criss-cross hopper 10 of the invention. Initially, black gel coatings were run to study thickness uniformity for a single coating by optical density method. Coatings were made under simulated production standards to confirm the coating superiority of the criss-cross hopper 10 of the invention over the conventional hopper 1. A wash and weigh method of measuring the coating uniformity was used. The "wash and weigh" method consists of cutting coated sheets of web into 18 equal square pieces from the entire width of the coating. Each piece is weighed and then washed to remove any of the coating. Each piece is then weighed again, and the difference in weight is then proportional to the coating thickness. Moreover, slot gauge uniformity was measured with a conventional electronic gauge of certain accuracy.

The first black-gel test of the criss-cross hopper 10 of the invention was designed to study the coating thickness uniformity as a function of density. Flows of 800, 1000, 1200, 1400 and 1600 cc/min at viscosity of 30 cps, were coated. The slot heights of both hoppers 10,1 were 0.010 inches. Once again, identical coating parameters were applied to the conventional hopper 1 for control.

Figure 8:
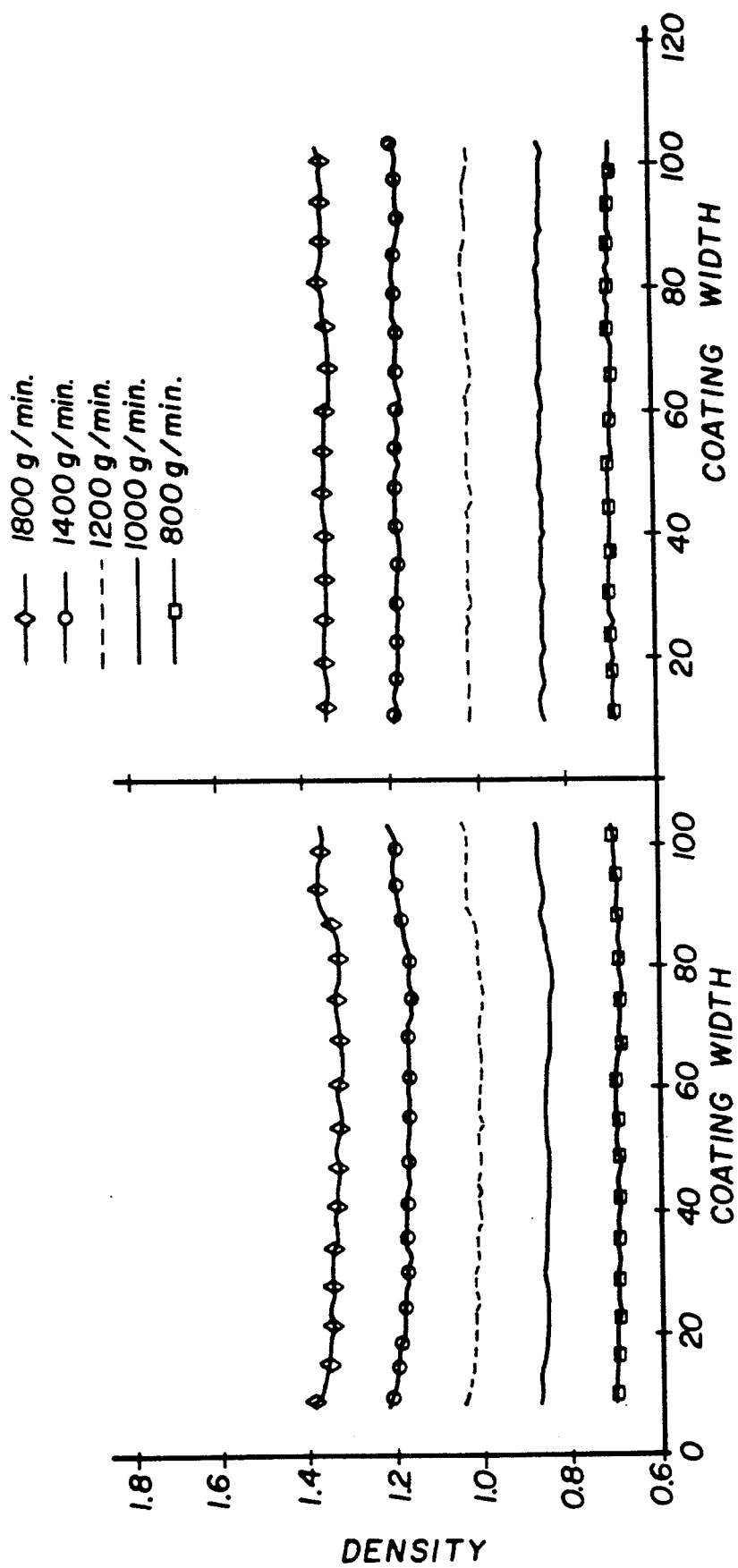
FIG. 8 shows web coating thickness versus density profiles for coatings produced in the hopper of the invention and in a conventional hopper.

The results of the thickness uniformity as function of density are shown in FIG. 8 comparing the conventional hopper 1 versus the criss-cross hopper 10.

Figure 9:
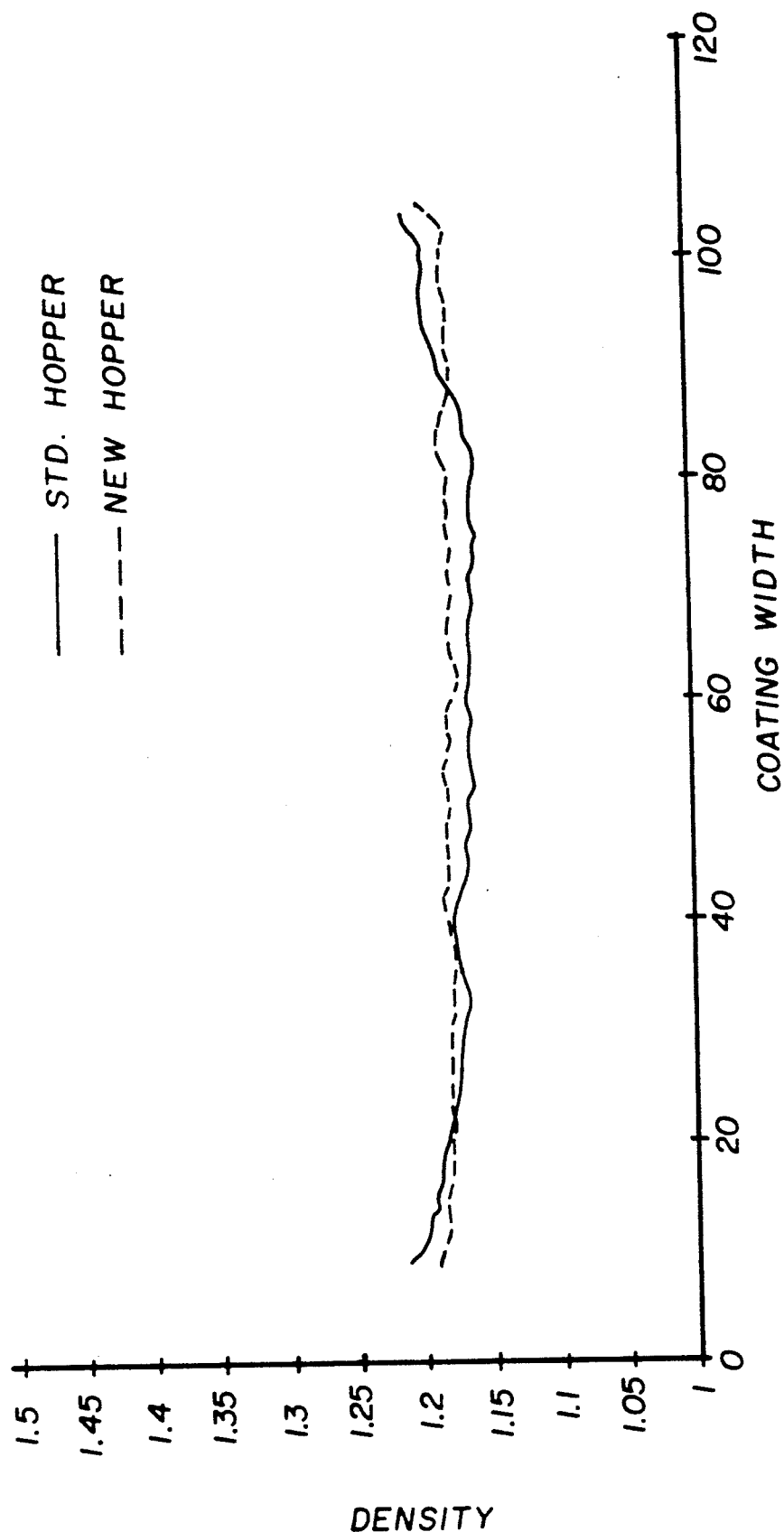
FIG. 9 shows web coating optical density profiles for coatings produced in the hopper of the invention and a conventional hopper.

The results show that coating thickness uniformity is improved for the hopper of the invention near the edges of the coatings at nearly all flow conditions. This improvement, shown in the reduction of edge to center variability even at the lowest flow rate tested (800 cc/min), is nearly 2-fold from 2% for the conventional hopper to only 1.3% for the crisscross hopper. The criss-cross improvement is clearly seen at the highest flow rate (1600 cc/min) where edge to center variability is improved 3-fold from 3.8% to only 1.2%. FIG. 9 shows such an improvement by comparing the widthwise density traces for both the criss-cross versus the conventional hopper.

EXAMPLE 2

Test 2 of the criss-cross hopper 10 of the invention was designed to test the coatability of a dyed sub layer with the criss-cross hopper 10 versus the conventional prior art hopper 1. Production-like coating conditions were simulated: flow range=300–600 cc/min, slot height=0.005 inches. Because a 0.005 inch slot was not available with the criss-cross hopper 10, the 0.010 inch slot was used during the experiment. The conventional hopper 1 slot height was still kept at 0.005 inches. The advantage of the larger slot is enhanced by the laws of laminar fluid flow which provide that the variation in flow for variations in slot size is proportional to the cube of the variation in slot size. For example, a slot variation that decreases the slot of 0.005 inch by 0.00005 inch will decrease the flow in proportion to the cube of ((0.005−0.00005)/0.010) or 0.985. Therefore, the same variation in slot dimension, 0.00005 inch, produces 97.0% of desired flow for the 0.005-inch slot and 98.5% for the 0.010-inch slot. The variation in coating thickness as a result of slot dimensional variation of 0.00005 inch has been reduced from 3.0% to 1.5% just by increasing the slot from 0;005 inch to 0.010 inch. However, conventional hopper 1 does not allow a large slot 4 because the flow distribution in the damping cavity 6 requires that the slot be as small as possible.

Figure 10:
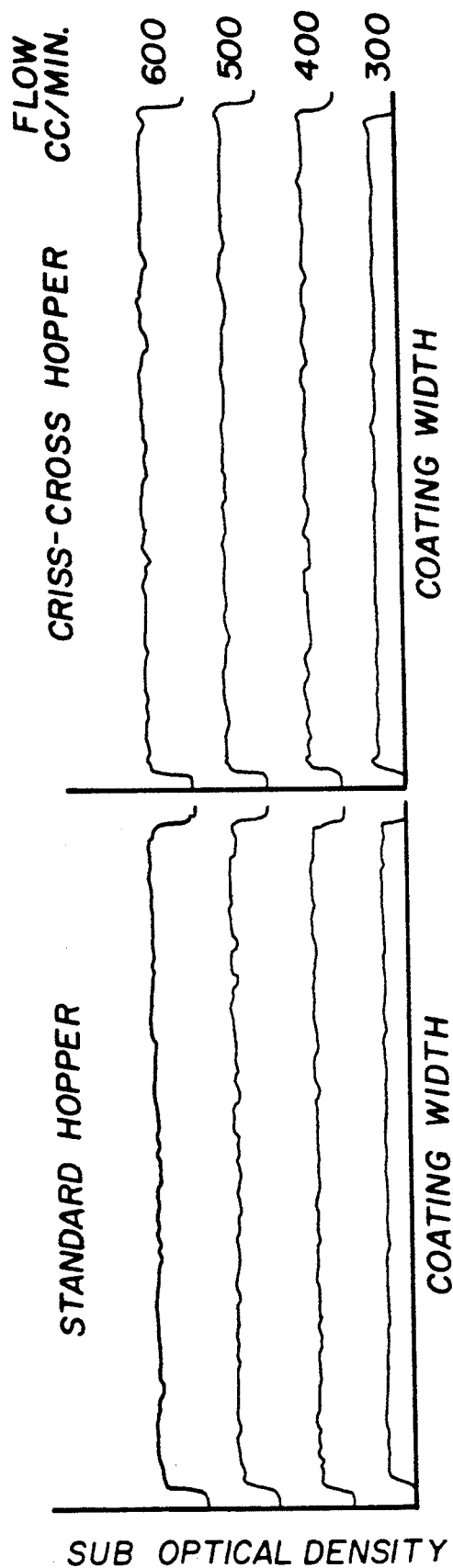
FIG. 10 shows web coating optical density profiles for coatings produced in the hopper of the invention and a conventional hopper.

Comparative results of optical density profiles for the conventional hopper 1 and criss-cross hopper 10 for various flow rates of the sub layer are shown in FIG. 10.

The results show that performance of the criss-cross hopper 10 was comparable to that of the 0.005 inch slot conventional hopper 1. More importantly, the results indicate that the size of the slot 69 does not directly control the widthwise distribution of the flow in the damping chamber 70 as it does in the conventional hopper 1.

EXAMPLE 3

Test 3 was an attempt to coat two very difficult layers that exhibit non-uniformities in widthwise coverage profiles. Layer 1 and layer 2 (described above) were the two webs that were coated. These spread layers are a $BaSO_4$/cellulose acetate based dispersion that form the structure of a porous "spreading" layer. The layers are coated at a flow rate of 2400 cc/min. The coating uniformity was measured by the "wash and weigh" method described above.

Figure 11:
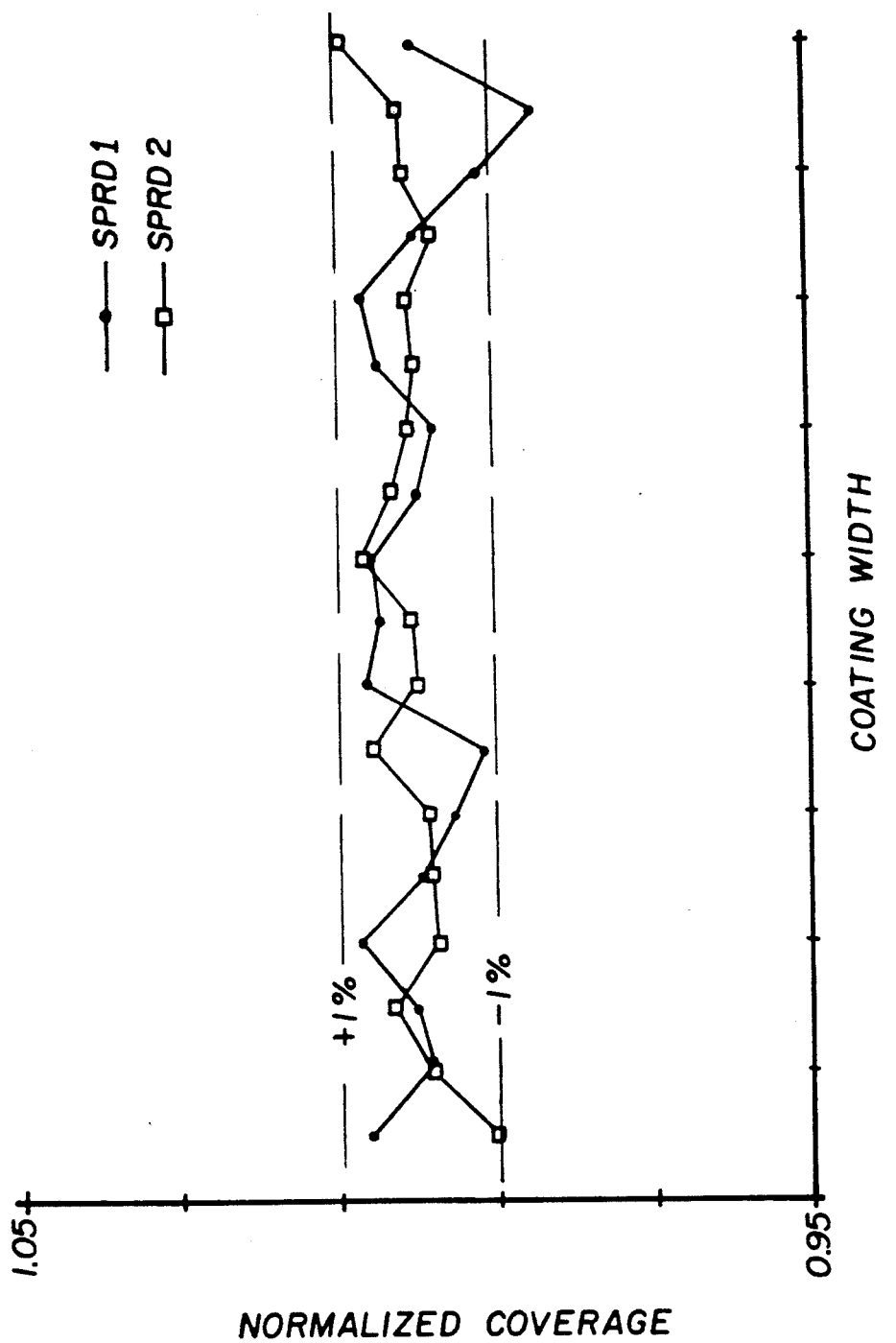
FIGS. 11 & 12 show normalized coverage data for the hopper of the invention and a conventional hopper, respectively; and, FIG. 13 shows normalized coverage data for hopper of the invention and a conventional hopper.
Figure 12:
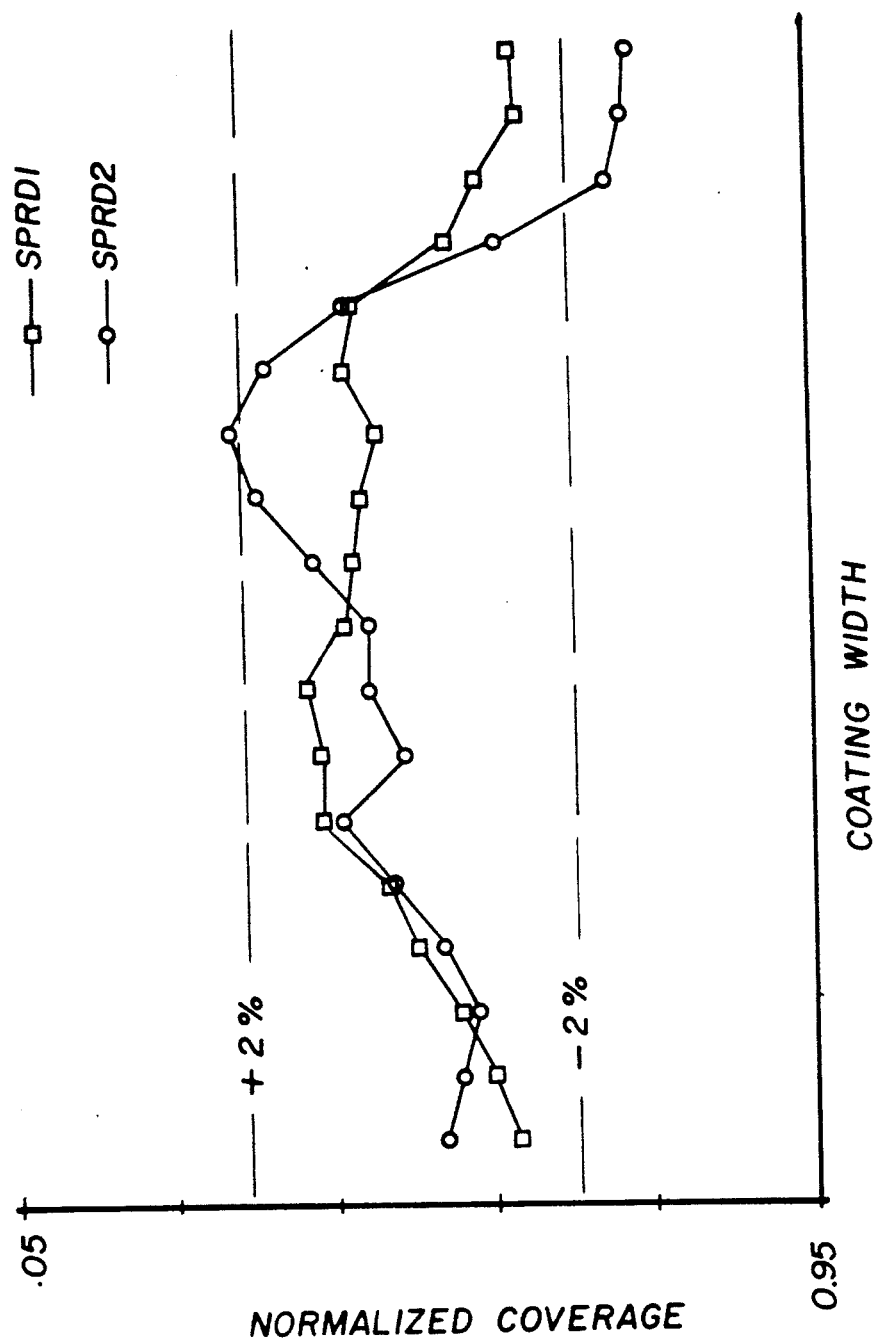

FIG. 11 and 12 show the normalized coverage data for the criss-cross hopper and the conventional hopper, respectively.

The data clearly show the improvement in widthwise profile of the criss-cross hopper of better than 1% versus more than 2% with the conventional hopper. This improvement is significant because for the specific rheological properties of these spread layers, given the non-uniformity seen with the prior art hopper 1 design, a change in the solution formulation of the spread layers would be one of the only means to improve coating widthwise uniformity. A solution formulation change still would not necessarily guarantee an improvement in coating widthwise uniformity. The improvements clearly seen with the criss-cross hopper 10 would prevent a need to reformulate these spread layer solutions.

EXAMPLE 4

Test 4 was designed to test yet another coating layer that exhibited poor widthwise uniformity in the conventional hopper. The test spread layer was another $BaSO_2$/cellulose acetate dispersion coated at a flow rate of 2450 cc/min, and slot height of 0.015 inches.

Figure 13:
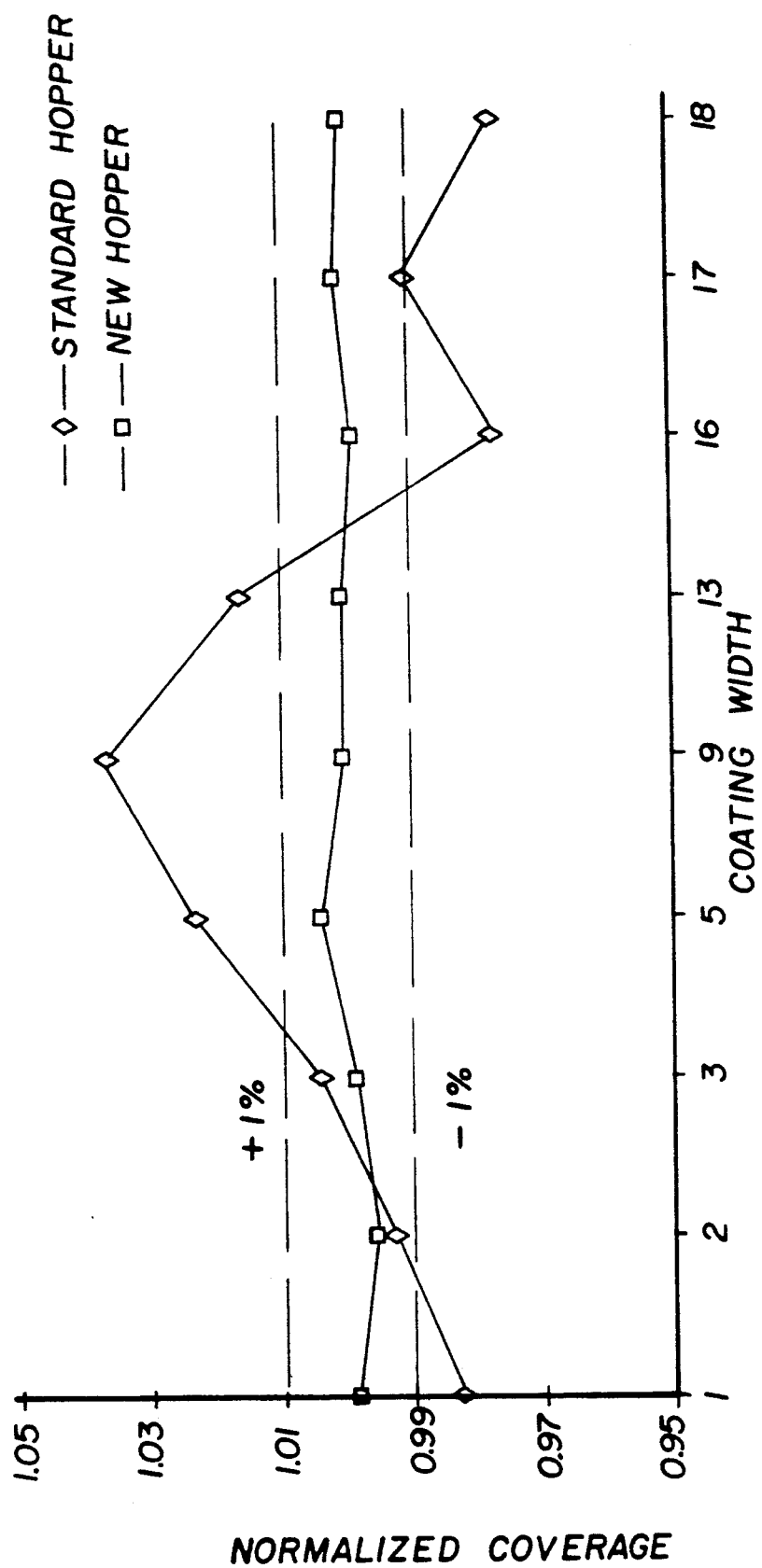

Comparative data of widthwise uniformity profiles for webs coated in the conventional hopper and in the hopper of the invention are shown in FIG. 13.

The results indicate that the prior art hopper 1 coating produced an edge to center variability of greater than 5%, while the criss-cross hopper coating indicated improvements of less than 1%.

Accordingly, the criss-cross hopper 10 of the invention has numerous advantageous effects over the conventional hopper 1. In particular, the criss-cross hopper of the invention does not produce flooding of material in an end portion of the fluid channel, is easy to clean and assemble, economical to manufacture, produces improved coating uniformity, and can produce quality coatings at large slot widths.

The claims in the specification describe the invention presented and the terms that are employed in the claims draw their meaning from the use of such terms in the specification. The same terms employed in the prior art may be broader than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood the that the invention is not limited to the embodiments set forth herein for purposes of exemplification, but is to be limited only by the scope of the attached claim or claims, including the full range of equivalency to which each element thereof is entitled.

Having described our invention in sufficient detail to enable those skilled in the art to make and use it, we claim and desire to secure Letters Patent of the United States for:

1. A criss-cross flow hopper comprising:
    a first hopper half having a first planar surface, the planar surface adjoining a first elongated cavity having an exit and an entrance end, the first cavity having a land surface near the entrance end and a first widthwise flow distribution channel adjacent said land surface;

a second hopper half having a second planar surface, the second planar surface adjoining a second elongated cavity having an exit end and an entrance end, the second cavity having a land surface near the entrance end and a second widthwise flow distribution channel;

an insert positioned against the land surface of the first hopper half and the land surface of the second hopper half wherein said first and second hopper halves and said insert cooperate to form an exit slot recessed into the first and second planar surfaces;

a damping chamber adjacent the exit slot and in fluid communication therewith at the exit end of the first and second cavities, the damping chamber being in fluid communication with the first distribution channel at a first side of the hopper, the damping chamber further being in fluid communication with the second distribution channel at a second side of the hopper; and, an entrance chamber at the entrance end of the first and second cavities, the entrance chamber being in fluid communication with the first distribution channel at the second side of the hopper and the entrance chamber in fluid communication with the second distribution channel at the first side of the hopper.

2. The hopper according to claim 1 wherein the first distribution channel tapers from the second side of the hopper to the first side of the hopper.

3. The hopper according to claim 1 wherein the second distribution channel tapers from the first side of the hopper to the second side of the hopper.

4. The hopper according to claim 1 further comprising fluid supply means for providing fluid to the entrance chamber.

5. The hopper according to claim 4 wherein the fluid supply means includes a passageway in the first hopper half.

6. The hopper according to claim 1 wherein the insert is comprised of a first half and a second half.

7. The hopper according to claim 1 wherein the insert is made of resilient material.

8. The hopper according to claim 1 wherein fluid flowing from the entrance chamber is split into equal portions as it flows into the first and second distribution channels.

9. The hopper according to claim 1 further comprising location pins placed on the land surface of the first cavity and the land surface of the second cavity, the location pins matching apertures in the insert to properly position the insert against the land surfaces.

10. The hopper according to claim 1 further comprising means to hold said first half and said second half together.

11. The hopper according to claim 10 wherein the means to hold are bolts.

* * * * *